April 1, 1941.  F. W. DINE  2,236,751
SAFETY DEVICE FOR AUTOMATIC HOLD-DOWN CONVEYERS
Filed May 15, 1939  3 Sheets-Sheet 3

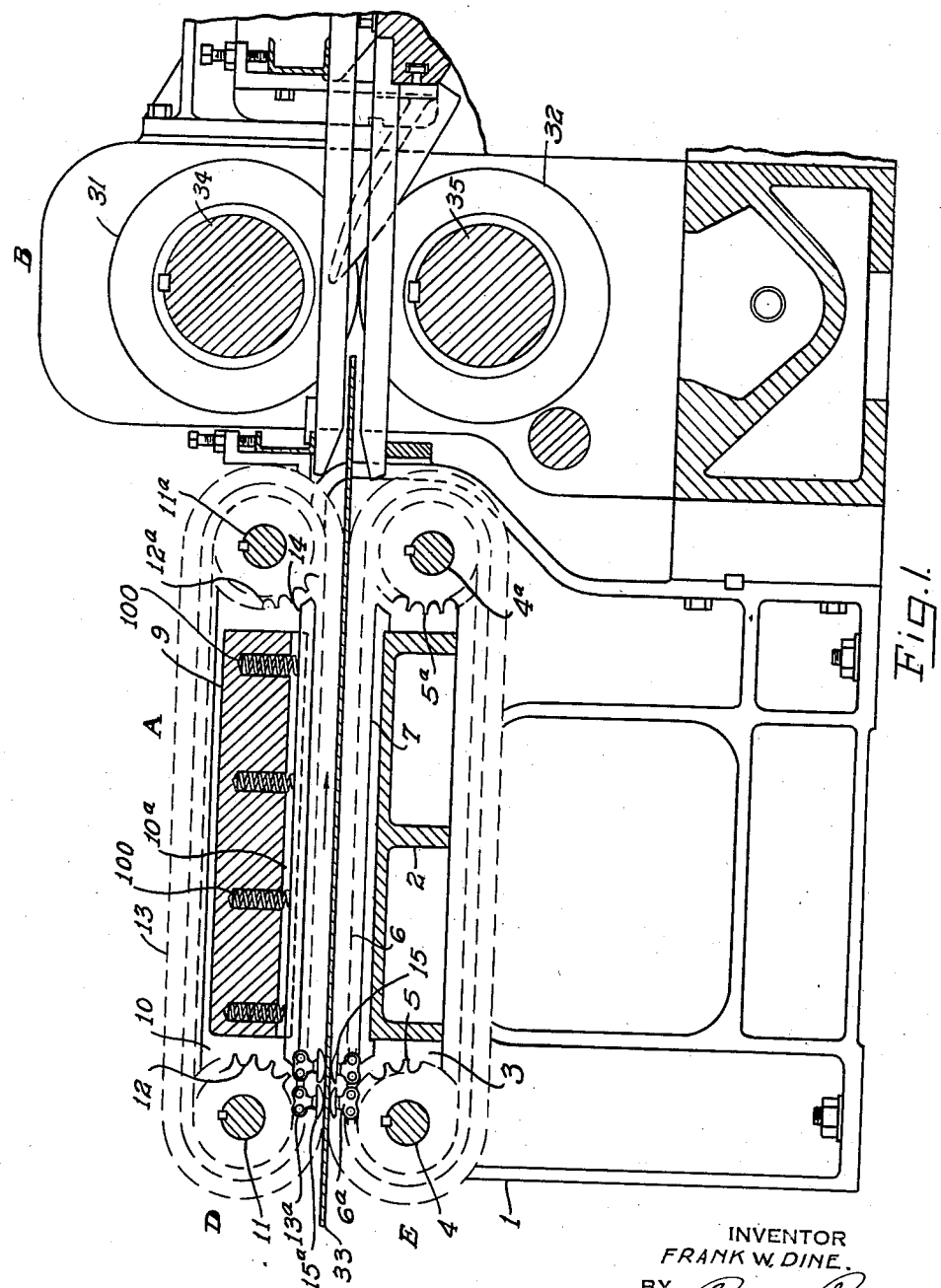

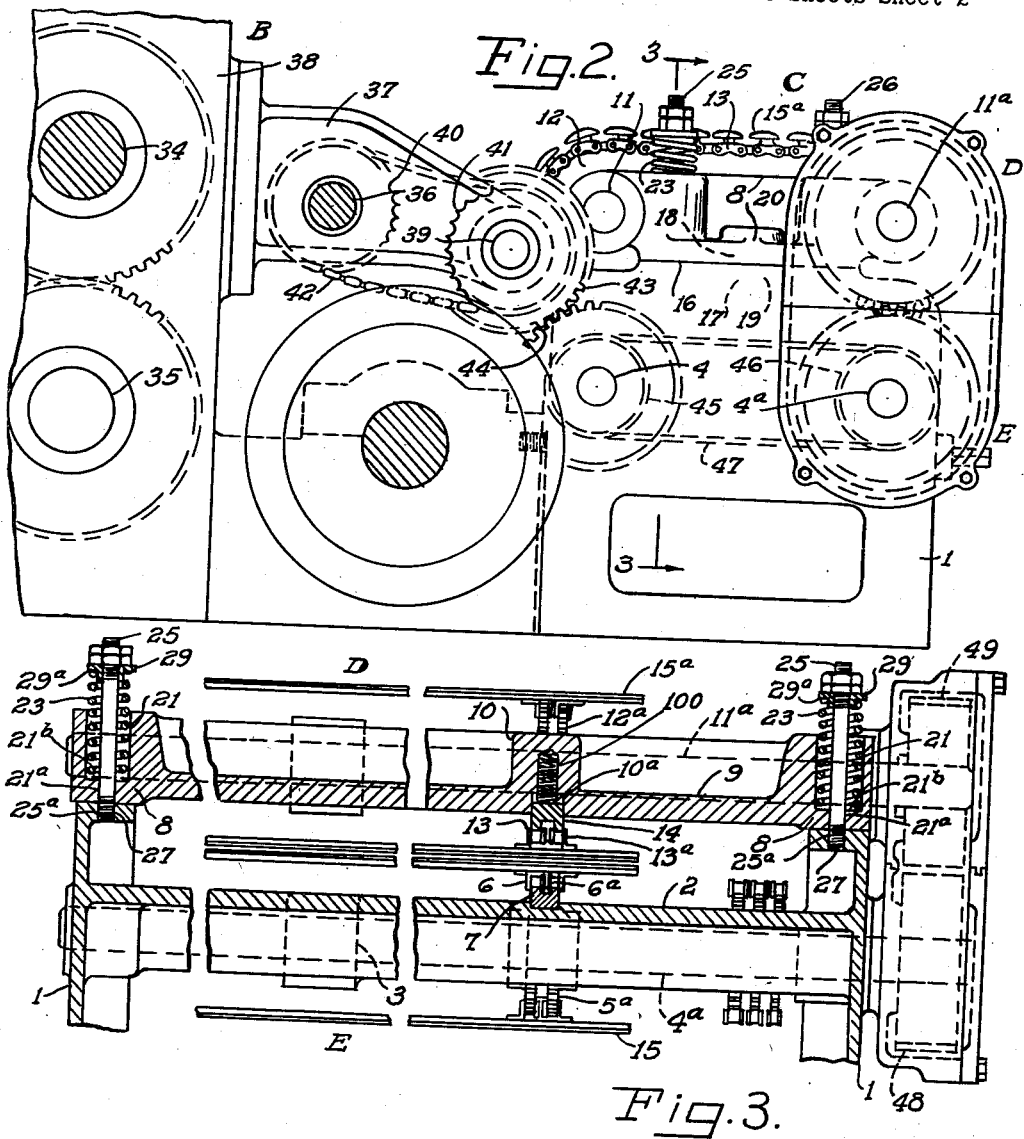
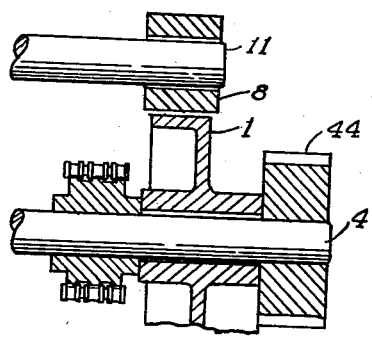

INVENTOR
FRANK W. DINE.
BY
ATTORNEYS

Patented Apr. 1, 1941

2,236,751

UNITED STATES PATENT OFFICE 2,236,751

SAFETY DEVICE FOR AUTOMATIC HOLD-DOWN CONVEYERS

Frank W. Dine, New Bremen, Ohio, assignor to The Streine Tool & Manufacturing Company, New Bremen, Ohio, a corporation of Ohio Application May 15, 1939, Serial No. 273,802

4 Claims. (Cl. 271—2.1)

This invention relates to machines for shearing continuous sheet metal plates or strips of the type described in the patent to Frank H. Streine, No. 1,812,122, issued June 30, 1931, and more particularly to improvements in the hold-down conveyer means of such machines.

Machines of the type herein referred to are employed for the purpose of trimming the side edges of metal strips or sheets fed thereto, or for cutting said metal strips or sheets into multiple lengths, or both. For the operation of trimming the side edges of said metal strips or sheets, rotary shearing means or slitters are ordinarily employed, although, of course, any suitable type of shearing mechanism may be utilized.

For the purpose of accomplishing either cutting operation involving the trimming of the side edges of the metal strips or sheets, or for cutting the said strips or sheets into multiple lengths, the sheets are required to be fed to the shearing or cutting devices in flat condition. For this purpose cooperating endless hold-down conveyers, which engage the metal sheets between them to flatten the same preliminary to the cutting operation, are employed for conducting the metal sheets to the cutting devices which are to perform the side edge trimming operation. Similar cooperating endless conveyer devices are employed for conducting the metal strips or sheets away from the cutting devices after the trimming operation has been performed to convey the metal sheets to the cutting devices employed for the purpose of cutting the said sheets into multiple lengths.

In apparatus of the class described, the various instrumentalities, such as the conveyers and cutting or shearing devices, ordinarily comprise separate units placed in contiguous relation and often powered from a single source of power. For the purpose of illustrating the invention, there has been illustrated apparatus comprising two conveyer units and a shearing unit comprising rotary shear means for the purpose of trimming the side edges of the metal strips or sheets. The shearing unit is positioned between two conveyer units and since each of the conveyer units comprise substantially the same elements, only one of the same will be described in detail in the accompanying specification, it being understood that the description thereof is applicable to the other conveyer unit so far as the features of novelty of the present invention are concerned. Each of the conveyer units comprises an upper hold-down device and a lower hold-down device.

The upper hold-down device cooperates with the upper surface of the metal sheet and the lower hold-down device cooperates with the under surface of the metal sheet, the two cooperating upper and lower endless hold-down devices serving to maintain the metal sheet in flat condition as it is being fed to the cutting devices. Said cooperating upper and lower hold-down devices are ordinarily maintained in fixed relation with respect to each other and this is necessary and desirable since the sheets must be presented to the shearing devices in flat condition for accurate cutting of their side edges. If they were not flattened out prior to the shearing operation, the sheets would have a tendency to camber and their side edges would not be straight when cut.

With the cooperating endless hold-down devices maintained in unalterable fixed relationship respecting one another, however, in the event of foreign material of any considerable size becoming dropped or otherwise emplaced on the upper surface of a sheet being fed to the cutting devices, which foreign material is thereby unintentionally carried to a position intermediate the cooperating endless upper and lower hold-down devices, no provision being made for altering the relative positions of said hold-down devices, the said foreign material will place an unaccustomed strain upon the affected parts of the machine and cause breakage or other serious damage to the hold-down devices or other related parts of the said conveyer means.

For example, under the conditions of use of such machine, it is not uncommon for tools, lumber, or stray pieces of metal to become accidentally lodged upon the upper surface of one of the strips or sheets being conveyed to the cutting devices and thereby being carried to a point intermediate said upper and lower hold-down devices, resulting ofttimes in serious damage because of the unalterable relation of said cooperating upper and lower hold-down devices.

It is the principal object of the present invention to provide means for maintaining the cooperating upper and lower hold-down devices, under ordinary conditions, in fixed relation to each other for the proper performance of their function of flattening the metal strip or sheet and maintaining the same in flattened condition, which said means is, however, yieldable to permit, upon occasion, the vertical movement of one of the cooperating hold-down devices respecting the other, whereby to permit the passage of foreign material, such as above mentioned, which may accidentally become emplaced upon the upper surface of the metal sheet, between the cooperating upper and lower hold-down devices without causing damage thereto, the passage of said foreign material intermediate said upper and lower hold-down devices merely causing vertical movement of one of the same whereby to cause vertical separation or temporary alteration of the fixed relation of the one of said hold-down devices respecting the other.

The cooperating upper and lower hold-down devices are ordinarily driven by means of cooperating meshing gears associated with each of said devices. The hold-down devices ordinarily comprise driven means such as sprockets mounted upon shafts, one shaft of each hold-down device having a gear mounted on one end thereof and a gear related to the upper holddown device meshing with the gear related to the lower hold-down device, whereby said devices are driven from a single source of power.

One of the difficulties, therefore, involved in the provision of means for altering the customary fixed relation of the upper and lower hold-down devices resides in the fact that any vertical movement or separation of one of said hold-down devices respecting the other causes the cooperating meshing gears to be moved out of mesh under certain conditions where the foreign material unauthorizedly resting between said upper and lower hold-down devices is of such size as to cause considerable movement of one of said hold-down devices respecting the other. Under such circumstances, were the horizontal positions of the upper and lower hold-down devices to be altered respecting each other during a period of vertical separation in which the said cooperating gears were caused to be placed out of mesh, upon passage of the foreign matter from between said upper and lower hold-down conveyers, the latter upon being restored to their original vertical relation, might not be concurrently restored to such horizontal relation as would enable proper meshing of the cooperating gear teeth. This might, upon occasion, cause damage to the gears, or, at least, tend to prevent restoration of the normal operation of the conveyor devices.

It is a further object of the invention to provide means for relating the upper and lower hold-down devices one to the other in such a manner that subsequent to any vertical separation thereof, as above described, the said devices will be restored to their identical, original positions respecting one another whereby said cooperating gears will be enabled to be moved out of mesh and into mesh respectively upon the vertical separation of said upper and lower hold-down devices and the subsequent movement of said devices toward their original positions vertically respecting each other.

In the accompanying drawings—

Figure 1 is a vertical sectional view taken longitudinally through the center of a machine embodying the present invention and comprising a cutting unit and front and rear conveyer units associated therewith, the said cutting unit and front conveyer unit being shown in the said figure.

Figure 2 is a side elevation of a portion of a machine embodying the invention, showing more particularly the association of the rear conveyer with the cutter unit, certain of the parts being shown in section.

Figure 3 is a transverse vertical sectional view through the rear conveyer unit taken on the line 3—3 of Figure 2 looking in the direction of the arrows.

Figure 6 is a vertical sectional view through a portion of the rear conveyer showing the front shafts thereof.

Figure 4:
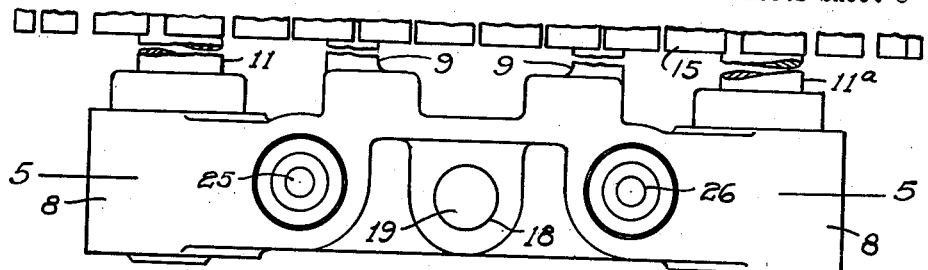
Figure 4 is a partial top view of the rear conveyer unit showing the conveyer housing.
Figure 5:
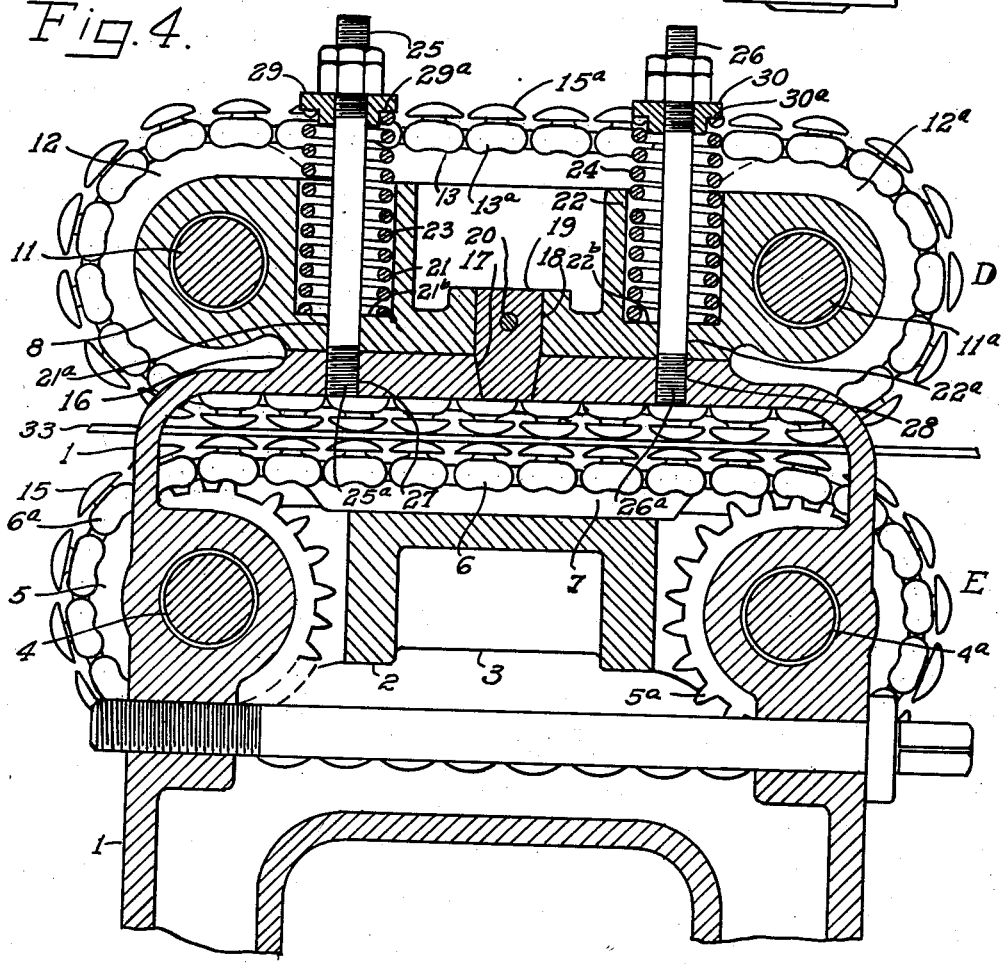
Figure 5 is a vertical sectional view through the rear conveyer housing taken on the line 5—5 of Figure 4.

Referring now to the drawings for a detailed description of the invention, the letter A generally designates the front conveyer unit; B the shearing unit; and C the rear conveyer unit. The front and rear conveyer units A and C are essentially the same in their general features of construction and the like parts of each will therefore be referred to by similar characters of reference.

Now first describing the conveyer units A and C, the same comprise upper hold-down instrumentalities generally designated D and lower hold-down instrumentalities designated E. The lower hold-down instrumentalities E of the said conveyer units A and C each comprise a frame structure consisting of side frame portions 1, at each side of each unit, extending longitudinally; transverse frame portions 2, extending between said side frame portions; and longitudinal frame portions 3, located intermediate the side frame portions 1 and supported by the transverse frame portions 2.

The frame portions 1, 2 and 3 comprise an integral frame unit for supporting the lower hold-down instrumentalities, now to be described. Extending between the side frame portions 1 are front and rear transverse shafts 4 and 4$^a$ respectively journaled in suitable bearing openings in said side frame portions. A plurality of sprockets 5 and 5$^a$ are fixed to, and spaced transversely upon, the said shafts 4 and 4$^a$ respectively. Trained over alined pairs of said sprockets 5 and 5$^a$ are chains 6 comprising links 6$^a$ which ride upon chain tracks 7 secured in the upper portions of the longitudinal frame portions 3.

The upper hold-down instrumentalities of the conveyer units A and C each comprise a frame structure consisting of side frame portions 8 extending longitudinally at each side of the unit; transverse frame portions 9 extending between said side frame portions 8; and longitudinal frame portions 10 intermediate said side frame portions 8. The frame structure, comprising the frame portions 8, 9 and 10, is a unitary structure.

Extending between the side frame portions 8, and journaled in suitable bearing openings therein, are transverse shafts 11 and 11$^a$ upon which are fixed spaced sprockets 12 and 12$^a$. Trained over alined pairs of sprockets 12 and 12$^a$ are chains 13 comprising links 13$^a$ which ride upon chain tracks 14 resiliently positioned in recesses 10$^a$ of the longitudinal frame portions 10 and maintained under tension against the links 13$^a$ of the chains 13 by means of springs 100.

It will be understood that the shafts 4 and 4$^a$ and 11 and 11$^a$ may have any desired number of sprockets mounted thereon and as many chains trained over said sprockets as there are sprockets on each shaft. The number of sprockets will depend upon the width of the conveyer unit and will be provided to give proper support to the transverse slats 15.

Narrow slats 15 and 15$^a$ extending transversely of said conveyer units A and C are secured to the links 6ª and 13ª of the chains 6 and 13 respectively of said lower and upper hold-down instrumentalities E and D. The lower faces of the side supporting frame portions 8 of the upper hold-down instrumentalities D rest normally upon the adjacent upper faces of the side supporting frame portions 1 of the lower hold-down instrumentalities D.

Thus, the upper hold-down instrumentalities D, comprising the frame portions 8, 9 and 10, shafts 11 and 11ª, sprockets 12 and 12ª, chains 13, and associated slats 15ª, is a unitary structure resting upon and supported by the lower hold-down instrumentalities E, which latter comprise the frame structure 1, 2 and 3, shafts 4 and 4ª, sprockets 5 and 5ª, chains 6, and their associated slats 15.

The upper portions 16 of the lower side frame portions 1 of the lower hold-down mechanism E are provided with tapered openings 17, the wider upper portion of said openings registering with openings 18 in the lower portions of the side frame portions of the upper hold-down mechanism D. Tapered posts 19, fitting in said openings 17 and 18, are secured in fixed relation within the openings 18, respecting the upper supporting members 8 by means of pins 20 passing through suitable openings in the supporting members 8 and in the posts 19. The posts 19 serve to center the upper frame structure 8, 9 and 10 respecting the lower frame structure 1, 2 and 3 and thus maintain proper vertical alinement of the upper and lower hold-down instrumentalities D and E.

The upper side frame portions 8 are provided with vertical passages, the upper portions 21 and 22 of which are of greater diameter than the lower portions 21ª and 22ª respectively. Coil springs 23 and 24 are seated in the portions 21 and 22 respectively of said passages and the lower ends of said springs 23 and 24 bear against the annular shoulders 21ᵇ and 22ᵇ respectively formed by the narrowing of said passages at their lower extremities. Bolts 25 and 26 extend through said vertical passages and the lower ends of said bolts are threaded, as at 25ª and 26ª respectively, to cooperate with interiorly threaded passages 27 and 28 of the upper portions 16 of the side frame portions 1.

The bolts 25 and 26 have threadedly secured to their upper ends the spring caps or collars 29 and 30, the shoulder portions 29ª and 30ª of which bear against the upper ends of the springs 23 and 24 to maintain the same seated against the seat portions 21ᵇ and 22ᵇ.

It will thus be seen that the spring members 23 and 24 normally maintain the upper and lower holddown devices in their fixed relation respecting one another through the bolts 25 and 26 secured to the lower supporting members 1, but that said normally fixed relation between said upper and lower hold-down devices is alterable to permit vertical separation of said devices because of the yieldability of said springs 23 and 24. The upper hold-down device is always maintained properly centered respecting the lower hold-down device by means of the tapered posts 19 which prevent alteration of the vertical alinement of the said hold-down devices when the upper hold-down device is restored to normal position after having been moved vertically away from said position.

The shearing unit B comprises oppositely disposed pairs of cooperating upper and lower disc knives 31 and 32, a pair of cooperating knives being located at each side of the unit B, said knives having oppositely ground peripheral edges constituting blades for shearing the side edges of metal sheets, such as that indicated at 33, when the same passes between said knives 31 and 32 upon being fed thereto by the conveyer instrumentalities indicated at A.

It will be understood that power may be applied to the various cutter and conveyer instrumentalities in any convenient manner. Ordinarily, however, power will be applied to one only of the knife shafts 34 and 35, and similarly to one only of the shafts 4 and 4ª or 11 and 11ª of the conveyer instrumentalities. Power will be transmitted to the other shafts through suitable power transmission instrumentalities.

In the embodiment of the invention disclosed in the drawings, power is applied to the conveyer units A and C by connecting one of the shafts 4 or 4ª of the lower conveyer instrumentalities E to the source of power and transmitting said power to the shafts 11 and 11ª of the upper hold-down instrumentalities D by suitable transmission mechanism. The manner in which power is transmitted from the shaft 4 of the lower hold-down instrumentalities E of the conveyer unit C, to the upper shafts 11 and 11ª of said conveyer unit C, will be described in detail and it will be understood that the same applies to the conveyer unit A.

The units A, B and C are powered from a single source of power not shown. One of the shafts 34 and 35, upon which the blades 31 and 32 are mounted, is connected to said source of power and the other of said shafts being driven thereby through cooperating gears related thereto, or other suitable means. Power is supplied to the unit C from a drive shaft 36 connected to the source of power, and journaled in a suitable bearing 37 formed as a part of the supporting casting 38 in which the shafts 34 and 35 are journaled. A drive shaft 39 is also journaled in the bearing portion 37.

Sprockets 40 and 41, mounted upon the shafts 36 and 39 respectively, have trained thereover a chain 42 which serves to drive the shaft 39 from the drive shaft 36. The shaft 39 also has mounted thereon a gear 43 which meshes with a corresponding gear 44 mounted upon the shaft 4. Mounted upon the shafts 4 and 4ª are sprockets 45 and 46 respectively, over which is trained a chain 47 for driving the shaft 4ª. Mounted upon the shafts 4ª and 11ª are cooperating meshing gears 48 and 49 respectively. The gears 44, 48 and 49 are mounted upon their respective shafts at the outer side of the lower and upper supporting castings 1 and 8. The sprockets 45 and 46 are mounted upon their respective shafts 4 and 4ª inwardly of the lower supporting casting 1.

In operation, the members 8, supporting the upper holddown mechanisms, will normally rest upon the upper surface of the supporting members 1 of the lower hold-down mechanism. The said supporting members are maintained in fixed relation respecting one another by means of the centering posts 19 and the springs 23 and 24 coacting with the bolts 25 and 26 secured to the lower supporting members 1.

When power is applied to the shafts 34 or 35 and 36, the rotary knives 31 and 32 will be caused to rotate in opposite directions through the cooperating meshing gears fixed to their respective shafts. The shaft 39 will be driven from the shaft 36 through chains 42 cooperating with the sprockets 40 and 41. Shaft 4 of the lower hold-down mechanism will be driven through the cooperating gears 43 and 44 mounted upon shafts 39 and 4 respectively. The lower hold-down mechanism comprising the chains 6 and slats 15 will be driven from shaft 4 by the sprockets 5. Shaft 4ª will be driven from shaft 4, through the sprockets 45 and 46 and the chain 47 trained thereover.

The meshing gears 48 and 49 fixed to the shafts 4ª and 11ª respectively will cause the latter shaft to be driven, and consequently the upper hold-down mechanism, comprising the chains 13 and slats 15ª, the said chains being driven by the sprockets 12ª fixed to said shaft 11ª. When a metal sheet, such as at 33, is introduced to the receiving end of the front conveyer A, or the left end referring to Figure 1, the said metal sheet will be frictionally engaged by adjacent slats 15ª and 15 of the upper and lower hold-down mechanisms respectively, the slats 15ª engaging the upper surface of said sheets and the slats 15 engaging the lower surface of said sheet. The slats 15ª and 15 of the upper and lower hold-down mechanisms respectively engaging the upper and lower surfaces of the metal sheet 33 are spaced from each other only a sufficient distance to permit the metal sheet 33 to be inserted therebetween, thereby permitting tight frictional engagement of said slats 15ª and 15 with the respective upper and lower surfaces of such sheet.

The metal sheet 33 will be caused to progress in the direction of the cutting unit B as the result of the frictional engagement of the upper and lower hold-down mechanisms. When power is applied thereto, the metal sheet 33 will pass between the pairs of rotary knives 31 and 32, positioned at each side of the cutting unit B, and the side edges of said metal sheet 33 will be trimmed off as a result of the operation thereupon of said cutting knives 31 and 32.

As the metal sheet 33 passes the point of operation thereupon, of the cutter knives 31 and 32, the said sheet progresses toward the rear conveyer unit C. Should it happen during the progress of the metal sheet 33, through the conveyers A and C that foreign material, such as scraps of wood, metal, etc., should become deposited upon the upper surface of a portion of the sheet which has not yet arrived at the receiving end of such conveyer, said foreign material will be engaged by the slats 15ª of the upper hold-down instrumentalities D, and this will cause the exertion of a force tending to separate the said upper and lower hold-down instrumentalities D and E vertically respecting one another.

In conveyers of the type described, in which the improvements of the present invention are not employed, such a condition would cause an unaccustomed strain upon the parts of the upper and lower hold-down instrumentalities resulting in breakage of said parts, or other damage, and stoppage of the machine. However, in devices of the type employing the improvements of the present invention, the condition, just described, created by the entrance of foreign material between the upper and lower hold-down mechanisms, will merely cause the upper conveyer D to be raised vertically against the pressure of the springs 23 and 24, the one end more so than the other, depending upon the degree of advance through the conveyer of said foreign material. Thus, a condition which would otherwise cause breakage, or other damage, and stoppage of the conveyer, merely causes a temporary vertical separation of the upper hold-down instrumentalities respecting the lower hold-down instrumentalities.

Should the foreign material, passing between the upper and lower hold-down instrumentalities, be of such size as to cause a degree of vertical movement of the upper hold-down instrumentalities, resulting in moving the gears 48 and 49 out of mesh, the conveyer will not be stopped thereby, since the shaft 4 of the lower hold-down instrumentalities will continue to rotate. After the foreign material has passed from between the upper and lower hold-down instrumentalities, the upper supporting members 8 will be restored to their original positions in contact with the upper surface of the lower supporting members 1, the said upper hold-down instrumentalities D being recentered respecting the lower hold-down mechanism E by reason of the vertical movement of the tapered posts 19 in their respective tapered openings 17 in the upper portions 16 of the lower supporting members 1.

Since the upper and lower hold-down mechanisms are thus restored to their identical original positions vertically respecting each other, after the foreign material has passed from between the upper and lower hold-down instrumentalities, the gears 48 and 49 will be restored to their proper original meshing relation and the operation of the conveyer continues as in the beginning.

Since passage of the foreign material between the upper and lower hold-down mechanisms does not cause the same degree of vertical movement respecting the entire horizontal length of the upper hold-down mechanism D, by reason of the fact that the degree of progress of the foreign material through the conveyer will cause more pressure upon one of the pairs of springs 23 and 24 than upon the other, except when said foreign material is at a point midway of the ends of the conveyer, the restoration of the upper hold-down instrumentalities to their original positions will not be a sudden, but a gradual, process. The process of restoration will begin after the foreign material has passed a point intermediate the ends of the conveyer at which time the portion of the upper hold-down instrumentalities D nearest the receiving end of the conveyer will begin to move downwardly, the pressure upon the springs 23 at such time having been somewhat decreased.

Since the process of restoration of the upper hold-down mechanism to its original position respecting the lower hold-down mechanism is a gradual one, the gear 49 will consequently gradually be restored to its proper position, permitting it to mesh with the gear 48, thereby eliminating the possibility of damage to the gear teeth of the gears which might be caused were the restoration more sudden.

Having thus described my invention, what I claim as new and desire to secure by Letters Patent of the United States is:

1. In apparatus of the class described, in combination, a plurality of cooperating endless conveyer devices, each of said devices comprising a frame, said frames having direct supporting contact with one another over an extended area lengthwise thereof, and means interconnecting said frames at spaced points lengthwise thereof for normally positively maintaining said frames in said direct supporting contact throughout said area, said means being yieldable to permit limited vertical separation of said frames, whereby material of greater vertical dimension than said distance, upon introduction between said devices, will cause vertical separation of said frames adjacent the immediate location of said material, and said means will tend to restore normal contact of said frames at said location upon movement of said material away from said location.

2. In apparatus of the class described, a plurality of cooperating endless conveyer devices, means for normally supporting said devices a predetermined distance apart, one of said devices being movable relative to the other to enable vertical separation of said devices, and means associated with said devices at spaced points lengthwise thereof for yieldably maintaining said devices in relatively fixed positions, said means comprising resilient means associated with one of said devices, securing means associated with the other of said devices and cooperating with said resilient means for the purpose stated.

3. In apparatus of the class described, in combination, a plurality of cooperating endless conveyer devices each comprising a frame, means for normally supporting said devices a predetermined distance apart, one of said devices being movable relative to the other to enable vertical separation of said devices, the frame of one of said devices having sockets therein at spaced points lengthwise thereof, resilient means positioned in said sockets, and securing means associated with the frame of another of said devices and cooperating with said resilient means for yieldably maintaining said frames in relatively fixed position.

4. In apparatus of the class described, in combination, a plurality of cooperating endless conveyer devices each having a frame, means for normally supporting said devices a pre-determined distance apart, one of said devices being movable relative to the other to enable vertical separation of said devices, means associated with said frames at spaced points lengthwise thereof for normally maintaining said devices in fixed horizontal position, said means being yieldable to permit vertical separation of said devices, the frame of one of said devices being provided with a conical opening and the frame of another of said devices being provided with a tapered post cooperating with said opening whereby to enable said devices to be properly re-aligned vertically upon being restored to their original positions horizontally after vertical separation thereof.

FRANK W. DINE.